(12) United States Patent
Goldman

(10) Patent No.: US 7,146,001 B2
(45) Date of Patent: Dec. 5, 2006

(54) DYNAMIC ESSENTIAL LINE SERVICE

(75) Inventor: Stuart O. Goldman, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 639 days.

(21) Appl. No.: 10/174,878

(22) Filed: Jun. 19, 2002

(65) Prior Publication Data

US 2003/0235286 A1 Dec. 25, 2003

(51) Int. Cl.
*H04M 3/00* (2006.01)
*H04M 11/00* (2006.01)
*H04M 7/00* (2006.01)

(52) U.S. Cl. .............. 379/243; 379/90.01; 379/220.01; 379/244

(58) Field of Classification Search ........... 379/220.01, 379/244, 90.01, 243
See application file for complete search history.

(56) References Cited

U.S. PATENT DOCUMENTS 4,497,979 A * 2/1985 Phelan ................... 379/244
5,761,278 A * 6/1998 Pickett et al. ............ 379/90.01
5,956,396 A * 9/1999 Ash et al. ............... 379/220.01

* cited by examiner

*Primary Examiner*—Wing Chan
*Assistant Examiner*—Thjuan P. Knowlin
(74) *Attorney, Agent, or Firm*—David J. Zwick; Steven R. Santema

(57) ABSTRACT

A switch-based feature that dynamically designates a class B line as class A if the call is a GETS call. The line remains class A until a non-GETS call is placed, whereupon the line reverts to its normal class B designation.

9 Claims, 2 Drawing Sheets

DYNAMIC ESSENTIAL LINE SERVICE

FIELD OF THE INVENTION

The present invention relates to assigning a high priority class of service to a telephone line, and more particularly to dynamically assigning a high priority class of service to a telephone line based on the last call placed.

BACKGROUND OF THE INVENTION

When disaster strikes, effective telecommunications for emergency response personnel involved in recovery efforts is essential. Since telecommunications capability can be severely affected due to excessive traffic in a disaster situation, loss of infrastructure and potential denial of service attacks, certain features can be included in the telecommunications network to enable and facilitate emergency response communications.

One such feature is the Government Emergency Telephone Service (GETS). GETS is a set of switch-based and Advanced Intelligent Network (AIN) features which allow authorized users to gain access to enhanced call completion features, including Alternate Carrier Routing, High Probability of Completion (HPC), HPC Detection and SS7 IAM Message Priority, HPC Trunk Queuing, HPC Exemptions From Network Management Controls, Enhanced Alternate Carrier Routing, and Default Routing. To gain access to GETS, a user first dials an access number, then enters an authentication PIN, and then enters the desired destination number. GETS operates on the major long-distance carrier networks, most local networks, including wire-line, cellular and PCS systems, and government-leased networks such as the Federal Telecommunications System (FTS2000) and the Defense Information System Network (DISN). Thus, GETS access is available from most every telephone line in the country.

Another related feature is Essential Line Service (ELS). ELS is a switch-based feature that allows priority access to dial tone when the switch is in certain overload conditions. Typically, telephone lines associated with "911" service, police, fire, ambulance and other emergency services are designated as ELS lines, commonly referred to as "class A" lines, with the remaining lines referred to as "class B" lines. As the switch becomes overloaded, certain controls are activated. Eventually, the switch denies dial tone to all but class A lines. The switch may then move in and out of the overload condition as a result of shedding new call attempts from class B lines, but can remain in overload for a significant period of time.

With ELS, emergency related lines are identified early on as part of a planning process, and these lines are engineered in the switch to be class A lines. GETS, on the other hand, is a "portable" service in that a GETS call may be placed on any available line without requiring the line to have been previously engineered for special treatment.

There is a problem with GETS during periods of heavy use and overload conditions in that a user desiring to place an emergency related GETS telephone call from a class B line during a switch overload condition may have to wait a very significant amount of time before receiving dial tone. The caller has to remain off-hook until the switch is no longer in ELS overload before the switch will again begin to process class B line origination attempts. Alternatively, the caller may periodically go off-hook and listen for dial tone.

It would be desirable for a class B line that places a GETS call to be temporarily dynamically designated as a class A line on the assumption that the next call made from the line will likely also be emergency related.

SUMMARY OF THE INVENTION

Accordingly, it is an object of the present invention to dynamically designate a class B line as class A based on the last call placed being a GETS call.

The present invention is a switch-based feature that will temporarily and dynamically designate a class B line as class A if the just completed call was a GETS call. Thus, if the switch goes into an overload condition such that only class A lines are receiving dial tone, a caller placing a series of GETS emergency related calls on an otherwise class B line will receive the benefit of using a class A line. When the caller places a non-GETS call, or, for example, after a certain interval, the line will revert to its normal class B designation.

DESCRIPTION OF THE PREFERRED EMBODIMENT

Figure 1:
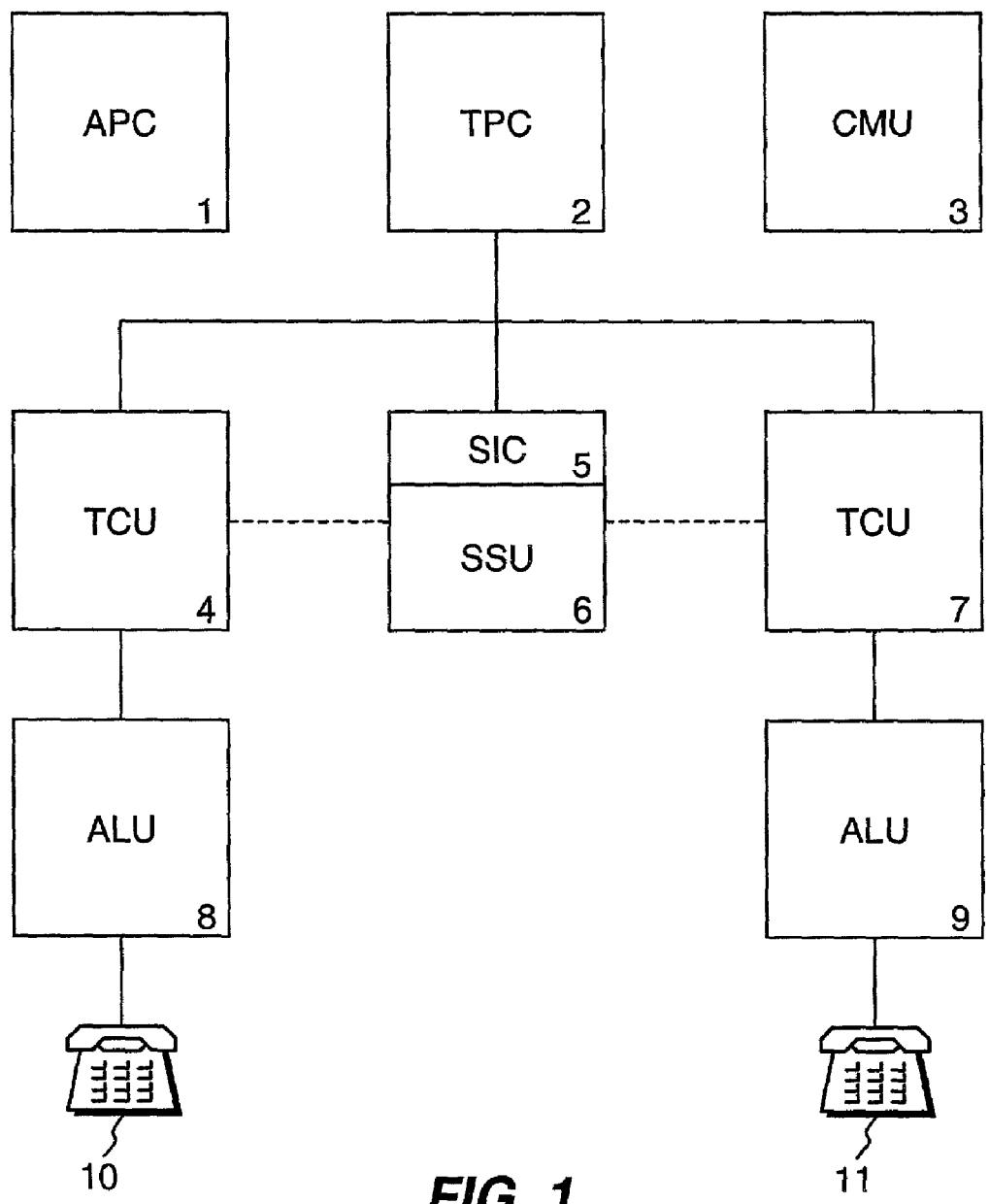
FIG. 1 shows a preferred embodiment of an overview functional block diagram of a central office switch on which the present invention resides.

FIG. 1 shows a preferred embodiment of an overview functional block diagram of a central office switch (COS) on which the present invention resides. While there are a variety of COS vendors and architectures available in the marketplace, those skilled in the art of the invention will readily be able to adapt the discussion of the invention's implementation on the exemplary switch to the switches and architectures they are familiar with. Also, while various enabling state and federal statutes, rules and regulations, most deriving from the Communications Act of 1934, give telecommunications providers the authority to preempt existing services based on priority service given to telephone lines associated with national security and emergency recovery, the exact implementation in the network is not specified. Thus, similarly, those skilled in the art of the invention will readily be able to adapt the discussion of the invention's implementation on the exemplary switch to the switches and architectures they are familiar with.

Telephony processor complex TPC 2 is the main processor for the COS. TPC 2 executes the higher level functions of a call and coordinates the space-time connectivity between peripheral processors and other call processing resources, such as digit receivers, directory number resolution, tones and announcements.

Administrative control processor APC 1 handles administrative duties of the COS, such as recent change functions, billing data generation, I/O terminal processing, and performance monitoring and error reporting.

Common memory unit CMU 3 contains static data, where the database for all devices in the COS is stored, and dynamic data about every call in progress on the COS.

Time switch and control units TCU 4 and TCU 7 are peripheral processors mainly controlled by TPC 2 that execute the scanning control code to look at lines, trunks and other devices, react to changes in their status, and report changes in status to TPC 2. Most of the hardware specific software resides in the TCUs.

TCU 4 and TCU 7 are connected to space switch unit SSU 6, the switching matrix of the COS. TCU 4 and TCU 7 perform the time slot interchange functions, as directed by TPC 2, to establish a call connection through SSU 6.

Space interface controller SIC 5 is the interface between SSU 6 and TPC 2. SIC 5 controls and directs information passed between TPC 2 and SSU 6. It also monitors and reports any errors occurring in SSU 6.

Analog line units ALU 8 and ALU 9 are connected to TCU 4 and TCU 7, respectively. The ALUs contain the individual line cards for the system as well as the line concentration modules. In this overview, the ALUs also contain DTMF receivers and tone generators. Telephone instruments and other customer stations such as 10 and 11 connect to line cards in ALU 8 and ALU 9, respectively.

The exemplary COS of FIG. 1 includes the Government Emergency Telephone System (GETS) feature, which is a set of switch-based and Advanced Intelligent Network (AIN) features which allow authorized users to gain access to enhanced call completion features by dialing an access number, entering an authentication PIN, then entering the desired destination number. This feature is available from virtually all telephone lines in the exemplary network.

The COS of FIG. 1 also includes the Essential Line Service (ELS) feature, which is a switch-based priority dial tone feature that denies dial tone in a switch overload condition to all but class A lines. A line, such as those to which telephone instruments 10 and 11 are connected, may be defined as class A in the switch database in CMU 3.

Administration software running on APC 1 monitors several critical switch resources to determine when machine overload is affecting the switch. These critical resources include processor real-time usage and common equipment usage. Processor real-time usage is the percent busy of the switch's telephony processor TPC 2 and the peripheral processors TCU 4 and 7. Various options allow for monitoring of individual processors and/or monitoring of an average usage across some or all processors. Common equipment usage is the percent busy of the switch's call registers in CMU 3, and the DTMF and MF receivers in TCUs 4 and 7. In the exemplary switch of FIG. 1, the ELS feature is activated when a first target percent usage of a critical resource is reached, and deactivated after a second lower target percent usage is reached, with the feature remaining active for at least a specified interval. Typically, during periods of extraordinarily high usage, a switch moves in and out of the overload condition as actions taken have the desired affect, albeit possibly only temporarily.

During normal switch operation, the scanning control function of a time switch and control unit, such as TCU 4 or 7, formulates a list of lines to scan for state changes, and directs analog line units, such as ALU 8 or 9, to scan the lines on the list. When the ELS feature is activated, the TCUs modify their scanning algorithm and choose only those lines defined as class A for ALU scanning. When ELS is deactivated, the regular scanning algorithm is again invoked.

In the preferred embodiment, the COS includes the feature of the present invention, referred to hereinafter as Dynamic Essential Line Service (DELS). With the DELS feature, if a first GETS access is made from a telephone line as determined by TPC 2 detecting that a GETS access directory number has been dialed, the line is changed to class A in its database entry, provided the line is not already defined as an ELS class A line. A DELS_ACTIVE bit is also set in the line's database entry indicating that DELS has updated the line to class A. On subsequent GETS accesses from the line, DELS determines that it has already updated the line to class A by the presence of the DELS_ACTIVE bit in the line's database entry and no further action is taken. If a non-GETS directory number is dialed, DELS reverts the line to class B and the DELS_ACTIVE bit is turned off.

In this manner, once a GETS call has been placed, the caller will receive the benefits of ELS for at least the next call, and for a series of calls if all calls in the series are GETS calls.

Figure 2:
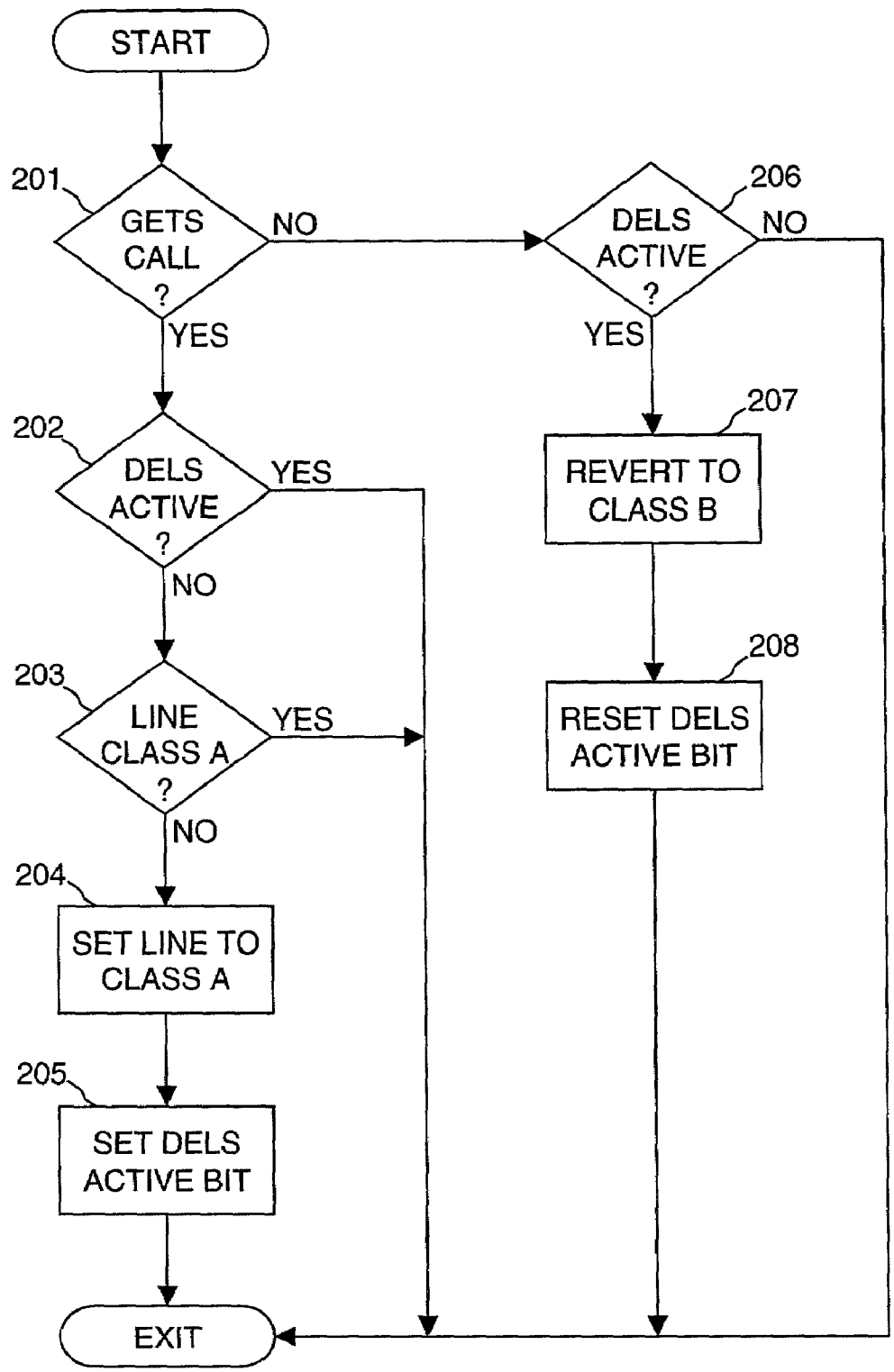
FIG. 2 shows a flowchart of a preferred embodiment of the present invention.

FIG. 2 shows a flowchart of a preferred embodiment of the present invention. After TCU 4 has collected digits, TPC 2 determines if the call is a GETS call (step 201). If the call is a GETS call, TPC 2 examines the database entry for the calling line to determine if the DELS feature is active on the line (step 202). If DELS is active on the line, TPC 2 exits the routine. If DELS is not active on the line, TPC 2 determines if the line is defined as a class A line in accordance with the ELS feature (step 203). If the line is defined as an ELS class A line, TPC 2 exits the routine. If the line is not defined as an ELS class A line, TPC 2 sets the line to class A (step 204), sets the DELS_ACTIVE bit (step 205), and exits the routine.

If TPC 2 initially determines that the call is not a GETS call (step 201), TPC 2 determines if DELS is active on the line (step 206). If DELS is not active on the line, TPC 2 exits the routine. If DELS is active on the line, TPC 2 reverts the line to class B (step 207), resets the DELS_ACTIVE bit (step 208), and exits the routine.

It is recognized that waiting until a non-GETS call is placed before reverting the line back to class B may leave otherwise class B lines as class A well after an overload condition has abated, but it is felt that there is not a negative impact by this condition. At most, only the next non-GETS call will receive ELS treatment, and all lines with DELS active will revert to class B lines with the next non-GETS call placed on the line. Once the overload condition has abated, there is no adverse affect on the switch and no benefit is afforded to the line still temporarily marked as class A. However, if this should prove to be a concern, a method to alleviate this concern would be to start a call timer coincident with some event in the call, such as the start or end of each GETS call or when the DELS feature sets the DELS_ACTIVE bit (step 205), and automatically revert the line to class B and reset the DELS_ACTIVE bit after a predetermined interval.

While the present invention has been shown and described with respect to a preferred embodiment, it will be understood by those skilled in the art that modifications may be made thereto without departing from the scope and spirit of the invention. For example, while the preferred embodiment describes the DELS feature determining if the call is a GETS call, other or additional emergency related directory numbers may be added to the list. More generally, while the preferred embodiment of the invention is directed to emergency related calls, it is possible to activate such a feature that changes some aspect of the line definition based on a directory number being dialed of a predetermined set of numbers, and to revert the line aspect to its original setting once a number is dialed that is not in the predetermined set of numbers.

Also, while the disclosure above describes the DELS feature as determining if the call should receive treatment based on a directory number dialed, more generally, any combination of numbers or digits dialed (which includes "*" and "#" or other special characters) may be used by the DELS feature to identify a call to receive treatment. In the lexicon of this disclosure and claims, directory number should be understood to encompass any suitable combination of dialed digits and characters.

Also, while in the preferred embodiment, main processing of the DELS feature takes place in TPC 2, other switches and architecture may process this feature in other elements of the switch.

It is understood that different service providers and manufacturers of central office switches may use terminology different from the "Essential Line Service", "class A" and "class B" terminology of this disclosure. In the lexicon of this disclosure and claims, these terms are intended to encompass equivalent functional features that may be referred to with different terminology.

It is intended that the scope of the invention be defined by the claims appended hereto and their equivalents.

What is claimed is:

1. In a central office switch serving a plurality of telephone lines, each line being defined by at least one common aspect, the aspect having plurality of values, a method comprising:

determining if the directory number dialed for a current call is of a predetermined set of directory numbers defining an emergency-related call;

determining if the value of the aspect was dynamically changed coincident to a previous call, the previous call defining one of: a just completed call or a first call in a series of emergency-related calls including the current call;

if the directory number dialed for the current call is of the predetermined set of directory numbers defining an emergency-related call and the value of the aspect was not dynamically changed coincident to a previous call, dynamically changing the value of the aspect coincident to the current call; and if the directory number dialed for the current call is not of the predetermined set of directory numbers defining an emergency-related call and the value of the aspect was dynamically changed coincident to a previous call, reverting the value of the aspect to its value before it was dynamically changed.

2. A method according to claim 1, further comprising:

after a predetermined interval after a predetermined event in the call, if the value of the aspect has been dynamically changed, reverting the value of the aspect to its value before it was dynamically changed.

3. In a central office switch serving a plurality of telephone lines, the central office switch including the Essential Line Service feature, each line being associated with a class value of class A or class B in accordance with the Essential Line Service feature, a method comprising:

determining if the directory number dialed for a current call is an emergency related directory number in a predetermined set of emergency related directory numbers;

determining if the class value was dynamically changed to class A coincident to a previous call, the previous call defining one of: a just completed call or a first call in a series of emergency-related calls including the current call;

if the directory number dialed for the current call is of the predetermined set of emergency related directory numbers and the class value was not dynamically changed to class A coincident to a previous call, dynamically changing the class value to class A coincident to the current call; and if the directory number dialed for the current call is not of said predetermined set of emergency related directory numbers and the class value was dynamically changed to class A coincident to a previous call, reverting the class value to class B.

4. A method according to claim 3, further comprising:

after a predetermined interval after a predetermined event in the call, if the class value has been dynamically changed to class A, reverting the class value to class B.

5. A method comprising:

defining an aspect of a calling telephone line, based on a serving switch having received an emergency service call via the calling telephone line; and applying the aspect to at least a next consecutive call following the emergency service call from the calling line.

6. The method of claim 5, wherein the step of defining an aspect comprises defining a class A service value in accordance with the Essential Line Service feature, the class A service value enabling the calling telephone line to receive a dial tone in overload conditions.

7. The method of claim 6, wherein the step of defining an aspect comprises dynamically changing from a class B service value to the class A service value.

8. The method of claim 6, wherein the step of applying the aspect comprises applying the class A service value to at least one call subsequent to the emergency service call.

9. The method of claim 5, wherein the step of defining an aspect is performed responsive to the serving switch processing a Government Emergency Telephone Service (GETS) call accessed from the calling line.

* * * * *